United States Patent [19]

Dubach

[11] Patent Number: 5,576,521
[45] Date of Patent: Nov. 19, 1996

[54] MULTIPLE READOUT SPRING SCALE

[75] Inventor: Werner F. Dubach, Maur, Switzerland

[73] Assignee: Createchnic AG, Dietlikon, Switzerland

[21] Appl. No.: 196,073

[22] PCT Filed: Jun. 15, 1992

[86] PCT No.: PCT/CH92/00115

§ 371 Date: Feb. 15, 1994

§ 102(e) Date: Feb. 15, 1994

[87] PCT Pub. No.: WO93/25873

PCT Pub. Date: Dec. 23, 1993

[51] Int. Cl.$^6$ ............... G01G 3/02; G01G 19/56
[52] U.S. Cl. .......... 177/233; 177/25.11; 177/25.16; 177/148
[58] Field of Search .................... 177/148, 149, 177/225, 233, 25.16, 25.11

[56] References Cited

U.S. PATENT DOCUMENTS

| | | | |
|---|---|---|---|
| 1,750,193 | 3/1930 | Reynolds | 177/233 |
| 3,223,189 | 12/1965 | Robbins | 177/148 |
| 3,229,780 | 1/1966 | Hanssen | 177/233 |
| 3,583,505 | 6/1971 | Van Valkinburg et al. | 177/225 X |
| 3,848,689 | 11/1974 | Hilterhaus | 177/233 |
| 4,116,290 | 9/1978 | Fishman | 177/149 |
| 4,765,420 | 8/1988 | Mengo | 177/149 |
| 4,785,897 | 11/1988 | Keinert, Jr. | 177/233 X |

FOREIGN PATENT DOCUMENTS

| | | |
|---|---|---|
| 2637972 | 3/1978 | Germany. |
| 2205169 | 11/1988 | United Kingdom. |

*Primary Examiner*—Brian W. Brown
*Assistant Examiner*—Randy W. Gibson
*Attorney, Agent, or Firm*—Weingarten, Schurgin, Gagnebin & Hayes LLP

[57] ABSTRACT

The invention concerns a spring scale with two tubular housing parts enclosing a spring, which can be slid within one another telescopically, with play, but which are unable to rotate due to their cross-sectional shape.

8 Claims, 2 Drawing Sheets

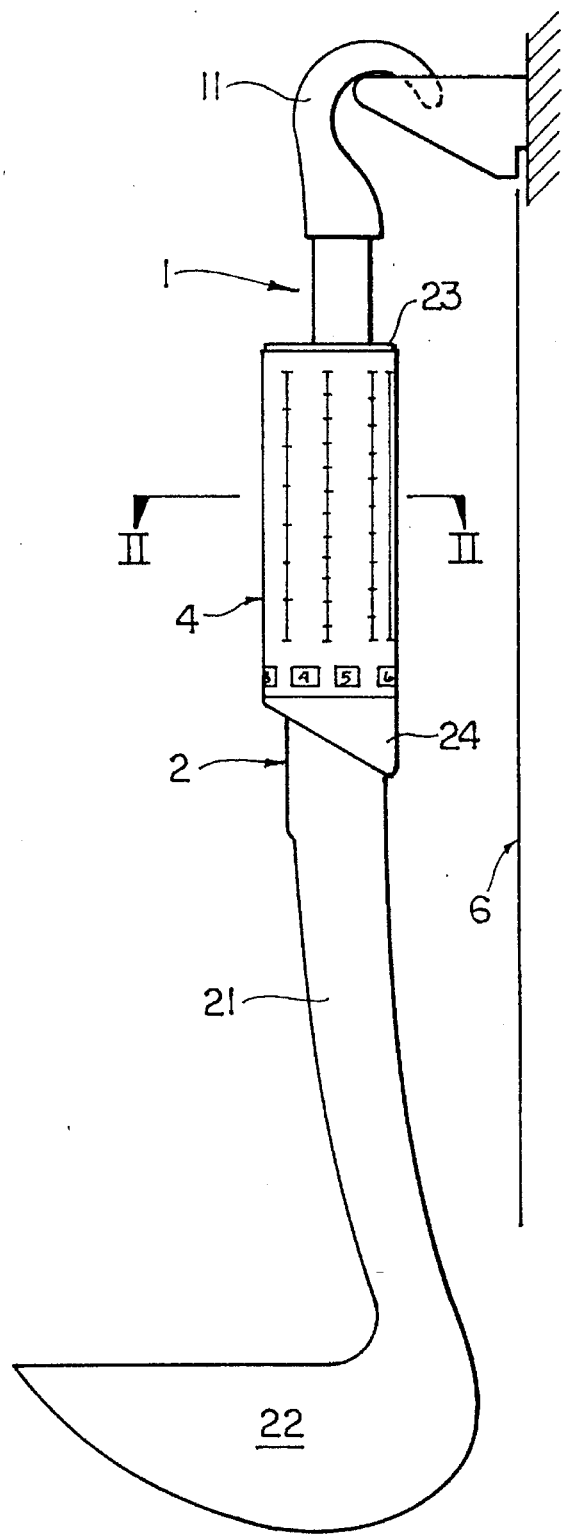
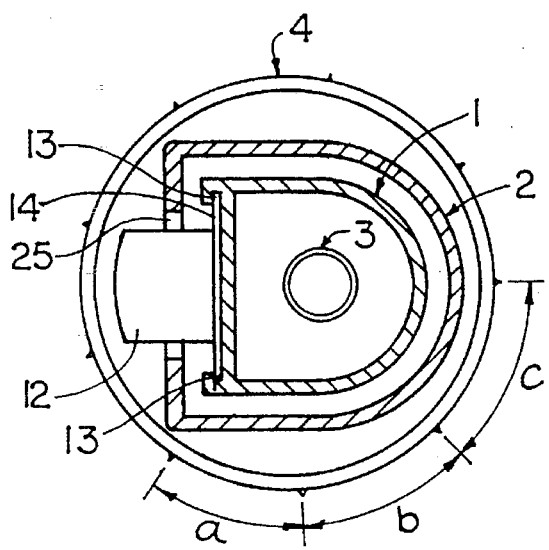
FIG. 1
FIG. 2

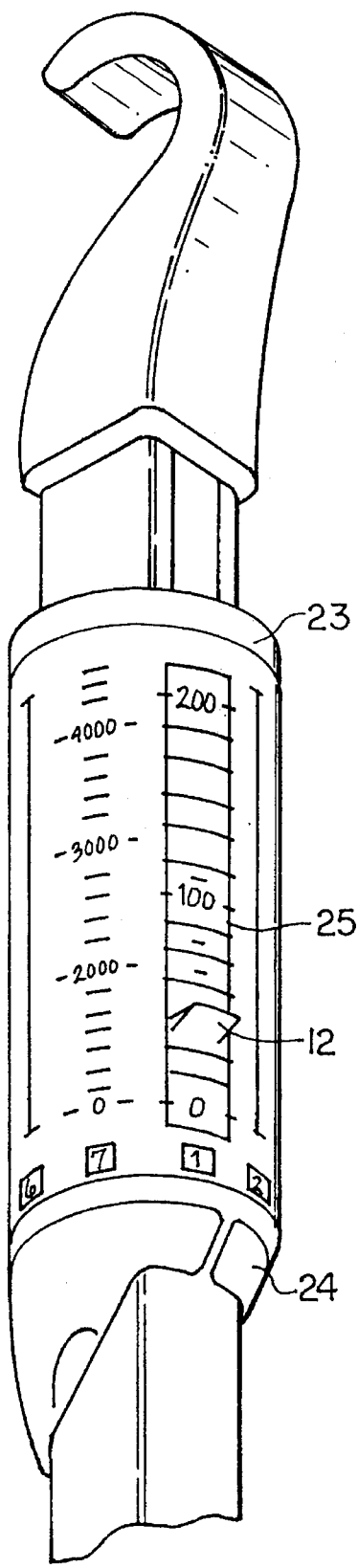

Scale 1
Dark Bread
Whole meal Bread
White Bread
Avocados
French Fries
Beef
Scale 2
Dates
Figs
Raisins
Dried apples
Cottage cheese
Sausage (cooked)
Mushrooms (cooked)
Scale 3
Corn flakes
Groats
Oatmeal
Hardtack
Flour
Rice
Pork (lean)
Pasta products (dry)
Cheese
Sugar
Zwieback
Scale 4
Chocolate
Scale 5
Nuts
Bacon (lean)
Scale 6
Butter
Margarine
Scale 7
Coconut oil
Oil
Lard
1 kj = 0.2389 kcal
1 kcal = 4185 kj

FIG. 3   FIG. 4

MULTIPLE READOUT SPRING SCALE

BACKGROUND OF THE INVENTION

The problem addressed by the invention is to create a spring scale with several readout scales, which can thus be used for different purposes. It can expediently assume the form of a scoop scale.

SUMMARY OF THE INVENTION

The invention achieves this goal with a spring scale having the special characteristics of patent claim 1. A particularly advantageous application results, if the spring scale is configured as a scoop scale and its readout scales are calibrated according to the calorie values of various foods. The scale can likewise be used as a calorie scale. The scales can also be calibrated in grams or in English units of weight, like the ounce.

BRIEF DESCRIPTION OF THE DRAWING

Illustrated in the enclosed drawing is an execution example of the invented article in which:

FIG. 1 shows a spring scale in the form of a scoop scale;

FIG. 2 is a cross section along line II—II in FIG. 1, on a larger scale;

FIG. 3 is a perspective view of the scale portion of the scale in FIG. 1, enlarged, and FIG. 4 shows a table.

DESCRIPTION OF THE PREFERRED EMBODIMENTS

Referring now to FIGS. 1–3 in which the elements are provided having like reference designates the spring scale, configured as a scoop scale, has an upper housing part 1, an outer, lower housing part 2 and a coil spring 3. The top of the upper housing part 1 is attached to a hook 11. The outer housing part 2 extends downward in the shape of a dipper arm 21 with a scoop 22. A first end of the spring 3 is attached to an internal surface of upper housing part 1, and the second end of spring 3 is attached to an internal surface of lower housing part 2.

The outer housing part is enclosed by a transparent hollow cylinder 4, marked with several readout scales calibrated at the periphery. This hollow cylinder can be rotated but is mounted on the outer housing part in such a way that it cannot be moved in the axial direction. The two flanges 23 and 24 serve to locate it. The lower flange 24 is integrally formed with the lower housing part 2. The upper flange 23 comprises a C-shaped collar which is adapted to fit over an upper portion of lower housing part 2, and thereby provides a stop to prevent the upper housing part 1 from extending away from lower housing part 2.

Mounted on the upper housing part 1 is an indicator blade 12 which projects through a lengthwise slot 25 in the outer housing part 2, which extends nearly up to the inner wall of the transparent cylinder 4. The indicator 12 is connected to the upper housing 1. Upper housing 1 has a flat front side which includes grooves 13 extending vertically on each edge of the flat side. A plate 14 is slidably held within grooves 13. Indicator 12 is integrally formed with the plate 14.

Displayed on the outer wall of the hollow cylinder are several different calibration scales. FIGS. 2 and 3 is an enlarged view of the readout portion of the spring scale. Nine different scales a, b, c . . . are available. One scale indicates the weight filled into the scoop in grams, another scale the weight in ounces. The remaining seven scales are subdivided into the calorie values of various food groups in kilojoules. To enable you to know which scale is to be used for which food group, a table 6 is used, like that shown in FIG. 4. This has great advantages.

People who submit to a diet, either of their own free will or by prescription, must know and take into account the calorie values of various foods. Available for that purpose is the table per FIG. 4, indicating the calorie value of various foods, for example, in kilojoules or kilocalories per unit of weight. Putting together a menu yourself on the basis of such a table requires considerable calculation work.

The user of the calorie scale needs only to glance at the table to see which group contains the food and to make the corresponding scale visible by rotating the cylinder 4. The scales are correspondingly numbered, as can be seen in FIG. 3.

Instead of subdividing the available scales as described above, it is also possible to calibrate them according to volume for bulk goods, like flour or rice or liquid with a different specific gravity. In cooking recipes the quantities are given in terms of the numbers of soup spoons, tablespoons or teaspoons. For technical purposes the scales can also be calibrated in terms of the number of pieces, for example, according to the number of screws, nuts, nails or tubular rivets. Because measurement in terms of pieces cannot be very exact, it is an option only for relatively cheap parts.

The indicator blade 12 is, as shown in FIG. 2, held by means of a plunger on the upper part 1. It can thus be moved during mounting for the purpose of adjustment or, respectively, setting to the zero value. Thus, the scale is zeroed by adjusting the plate 14 which includes indicator 12 to a zeroing position. The indicator 12 is moved with respect to the cylinder 4.

The table 6 (FIG. 4) needed for the use as a calorie scale can, for example, be hung up with it by means of a hook attachable to a wall, as this is illustrated in FIG. 1.

I claim:

1. A spring scale comprising a tubular upper housing part;

a tubular lower housing part wherein said tubular upper housing part can slide within said tubular lower housing part telescopically and wherein said tubular upper housing part and said tubular lower housing part are provided having a predetermined cross-sectional shape selected such that said tubular upper housing part and said tubular lower housing part cannot rotate relative to each other and wherein said tubular lower housing part is provided having a lengthwise slot therein;

a spring having a first end and a second end, the first end of said spring attached to an internal surface of said tubular upper housing part, the second end of said spring attached to an internal surface of said tubular lower housing part;

an indicator blade, coupled to said upper housing part and disposed such that said indicator blade projects through the lengthwise slot with lateral clearance; and a transparent cylinder, rotatably mounted on said tubular lower housing part and enclosing said tubular lower housing part, wherein said transparent cylinder displays calibrated readout scales on at least a portion of a first surface thereof.

2. The spring scale of claim 1 further comprising:

a hook coupled to a first end of said tubular upper housing part, said hook for hanging up the spring scale; and a scoop coupled to a second end of said lower tubular housing part.

3. The spring scale of claim 2, wherein:

the readout scales are provided having subdivisions provided thereon wherein the readout scale is calibrated in calories such that the spring scale is provided as a calorie scale; and a separate table indicates which scale is to be used for which food.

4. The spring scale of claim 2, wherein the readout scales are provided having subdivisions corresponding to at least one of grams or English units of weight.

5. The Spring scale of claim 2 wherein the readout scales are subdivided according to volume.

6. The spring scale of claim 2 wherein the scales are subdivided according to numbers of pieces of known parts.

7. A spring scale comprising an upper housing part;

a lower housing part wherein said upper housing part can slide within said lower housing part telescopically and wherein said upper housing part and said lower housing part are provided having a predetermined cross-sectional shape selected such that said upper housing part and said lower housing part cannot rotate relative to each other and wherein said lower housing part is provided having a lengthwise slot therein;

a spring having a first end and a second end, the first end of said spring attached to an internal surface of said upper housing part, the second end of said spring attached to an internal surface of said lower housing part;

an indicator blade, coupled to said upper housing part and disposed such that said indicator blade projects through the lengthwise slot with lateral clearance; and a cylinder rotatably coupled to and disposed about at least a portion of said lower housing part.

8. The scale of claim 7 wherein:

said upper housing part and said lower housing part are provided as tubular housings;

the slot in said lower housing part is provided as a lengthwise slot; and said cylinder is provided from a transparent material and said transparent cylinder encloses said lower housing part and said cylinder has calibrated readout scales disposed on a peripheral surface thereof.

* * * * *

UNITED STATES PATENT AND TRADEMARK OFFICE
CERTIFICATE OF CORRECTION

PATENT NO. : 5,576,521
DATED : November 19, 1996
INVENTOR(S) : Werner F. Dubach

It is certified that error appears in the above-identified patent and that said Letters Patent is hereby corrected as shown below:

Title Page; in the Heading, PCT No.: § 371 Date:
"February 15, 1994" should read --February 14, 1994--.

Title Page; in the Heading, PCT No.: § 102(e) Date:
"February 15, 1994" should read --February 14, 1994--.

Column 1, line 35, "designates" should read --designations--.

Signed and Sealed this

Twenty-fifth Day of August, 1998

Attest:

BRUCE LEHMAN

*Attesting Officer*　　　*Commissioner of Patents and Trademarks*